United States Patent [19]
Grossnickle

[11] Patent Number: 6,137,842
[45] Date of Patent: Oct. 24, 2000

[54] SYSTEM AND METHOD FOR DETERMINING THE TIME DIFFERENCE OF ARRIVAL OF A FREQUENCY SHIFT KEYED SIGNAL AT TWO SEPARATE RECEIVERS

[75] Inventor: Peter C. Grossnickle, San Diego, Calif.

[73] Assignee: The United States of America as represented by the Secretary of the Navy, Washington, D.C.

[21] Appl. No.: 08/979,633

[22] Filed: Nov. 28, 1997

[51] Int. Cl.[7] .................................................. H03D 3/00
[52] U.S. Cl. ........................ 375/334; 375/272; 342/450; 455/456
[58] Field of Search .................................. 375/224, 225, 375/324, 334, 347, 349, 354, 272; 342/389, 442, 450, 451; 455/415, 456

[56] References Cited

U.S. PATENT DOCUMENTS

| | | |
|---|---|---|
| 3,846,708 | 11/1974 | Franco . |
| 4,087,816 | 5/1978 | Barszczewski et al. . |
| 4,433,422 | 2/1984 | Kurth . |
| 4,445,118 | 4/1984 | Taylor et al. . |
| 4,631,543 | 12/1986 | Brodeur ................................... 342/389 |
| 4,694,453 | 9/1987 | Kobayashi et al. . |
| 4,860,001 | 8/1989 | Yamanaka et al. . |
| 5,025,457 | 6/1991 | Ahmed .................................... 375/354 |
| 5,361,398 | 11/1994 | Christian et al. . |
| 5,633,895 | 5/1997 | Powell, II et al. ...................... 375/324 |
| 5,724,047 | 3/1998 | Lioio et al. .............................. 342/442 |
| 5,781,588 | 7/1998 | Abe et al. ................................ 375/334 |
| 5,835,530 | 11/1998 | Hawkes ................................... 375/225 |

*Primary Examiner*—Stephen Chin
*Assistant Examiner*—Chieh M. Fan
*Attorney, Agent, or Firm*—Harvey Fendelman; Peter A. Lipovsky; Michael A. Kagan

[57] ABSTRACT

A system determines the time difference of arrival of a frequency shift keyed signal (FSK) source at two separate receiver sites. The system includes a first receiver located at a first site for generating a first series of signal samples in response to detecting an FSK signal from a FSK signal source. A second receiver located at a second site generates a second series of signal samples in response to detecting the FSK signal. A first computer estimates first frequency shift times of the FSK signal in response to receiving the first series of signal samples and a time reference signal, and generates a first output signal representing the first frequency shift times. A second computer estimates second frequency shift times of the FSK signal using the second series of signal samples and time reference signal, and determines the path difference between the FSK signal source and each of the first and second receivers using the first output signal containing the first frequency shift times, and the second frequency shift times. The invention obviates the need for providing a replica of the first signal samples to the second computer.

14 Claims, 9 Drawing Sheets

PHASE VS. SAMPLE NO.

UNWRAPPED PHASE VS. SAMPLE NO.

SYSTEM AND METHOD FOR DETERMINING THE TIME DIFFERENCE OF ARRIVAL OF A FREQUENCY SHIFT KEYED SIGNAL AT TWO SEPARATE RECEIVERS

BACKGROUND OF THE INVENTION

The present invention generally relates to the field of transmission path delay measurements, and more particularly, to a system of determining the time difference of arrival of a frequency shift keyed (FSK) signal at two separate receivers.

Time-difference-of-arrival (TDOA) measurements find applications in one of two areas. In the first type of application, if the propagation velocity of an FSK signal is known, then inferences can be made regarding the signal source location, assuming known receive site locations. In particular, a single TDOA measurement between two receive sites indicates that the source is on a specific hyperbolic spheroid. TDOA measurements between multiple receive sites allows estimation of source location in three dimensions. In the second type of application, if both source and receive site locations are known, then TDOA measurements can indicate the propagation velocity of the FSK signal. The propagation velocity, in turn, can be used to infer characteristics of the propagation medium.

The common method of measuring TDOA is as follows. At each of two receive sites (1 and 2), the received signal is digitized with an analog-to-digital converter (A/D) synchronized with the other site. A set of sequential samples (a frame) is transmitted from site 1 to site 2. At site 2, corresponding frames are compared, via a cross-correlation technique, to estimate the relative delay between the two frames of data, referred to as an estimate of the TDOA. This method of estimating TDOA requires that an entire frame of data be transmitted from one receive site to another. Delay estimation accuracy increases with longer data frames. So the amount of data to be transmitted may be quite large relative to available communications resources.

A need therefore exists for a system and method for determining TDOA values which does not require transmission of an entire frame of data from one receiver site to another.

SUMMARY OF THE INVENTION

The present invention provides a system for determining the time difference of arrival (TDOA) of a frequency shift keyed signal (FSK) at two separate receiver sites. This invention addresses the inter-site communications bandwidth problem. Using a particular signal type (FSK), the invention provides a system and method for determining a TDOA which requires that only a limited set of data be transmitted from one receiver site to another. This data consists of the measured frequency shift times. Frequency shift times are computed at receive sites 1 and 2. The set of frequency shift times computed at site 1 is transmitted to site 2. At site 2, the corresponding frequency shift times are compared. Their average difference between corresponding frequency shift times is the estimated TDOA between sites 1 and 2.

More specifically, the system includes a first receiver located at a first site for generating a first series of signal samples in response to detecting an FSK signal from a FSK signal source. A second receiver located at a second site generates a second series of signal samples in response to detecting the FSK signal. A first computer estimates first frequency shift times of the FSK signal in response to receiving the first series of signal samples and a time reference signal, and generates a first output signal representing the first frequency shift times. A second computer estimates second frequency shift times of the FSK signal using the second series of signal samples and time reference signal, and determines the TDOA between the FSK signal at the first and second receivers using the first output signal, containing the first frequency shift times, and the second frequency shift times.

An important advantage of the invention is that the TDOA of a signal may be determined with only minimal inter-site communications requirements. The invention obviates the need for transmitting a replica of the first series of signal samples to the second computer. The techniques implemented by the invention may be applied to both radio frequency and acoustic FSK signals.

BRIEF DESCRIPTION OF THE DRAWINGS

Throughout the several views, like elements are referenced using like designations.

DESCRIPTION OF THE PREFERRED EMBODIMENT

Figure 1:
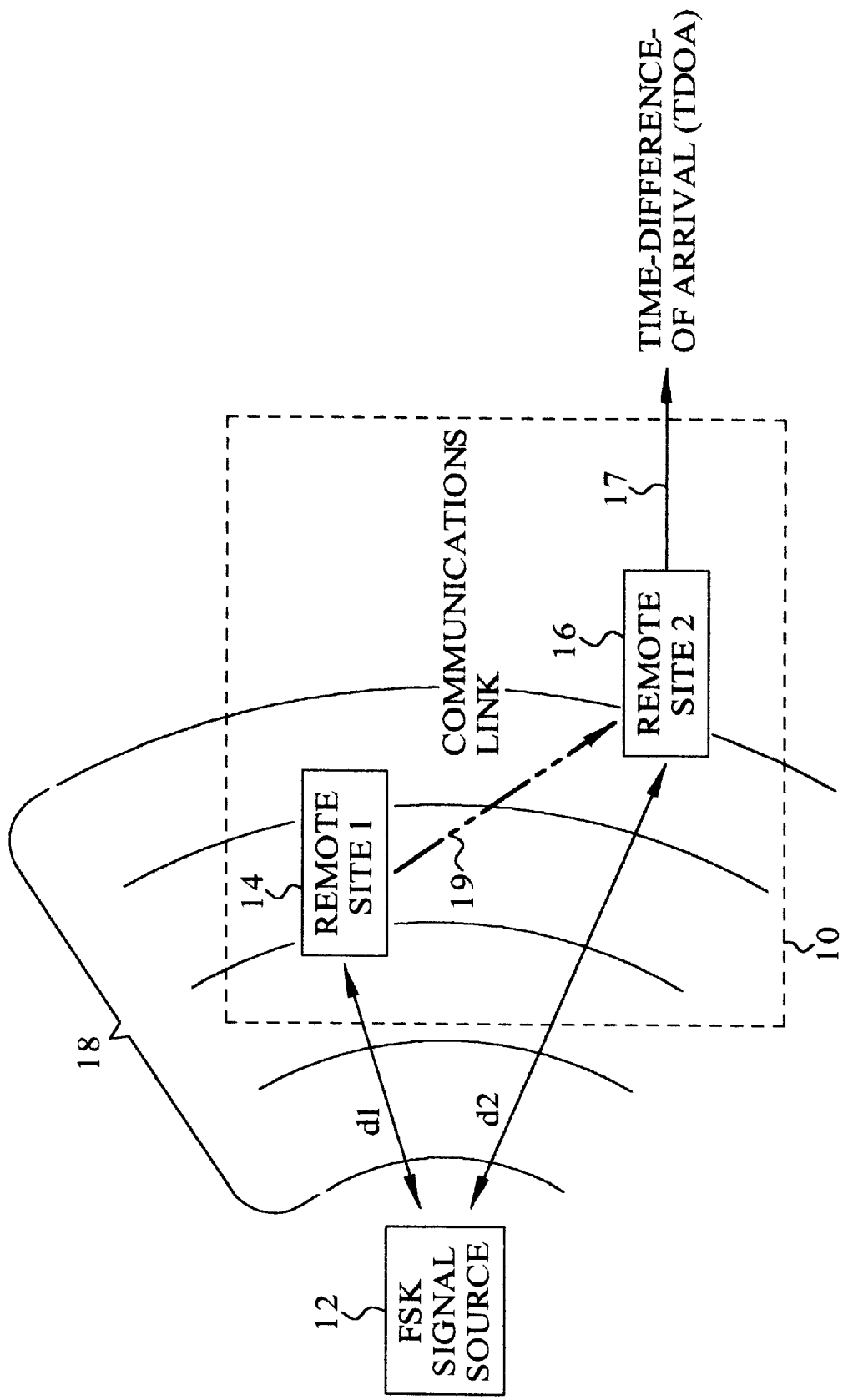
FIG. 1 presents an overview of a TDOA measurement system embodying various features of the present invention.
Figure 2:
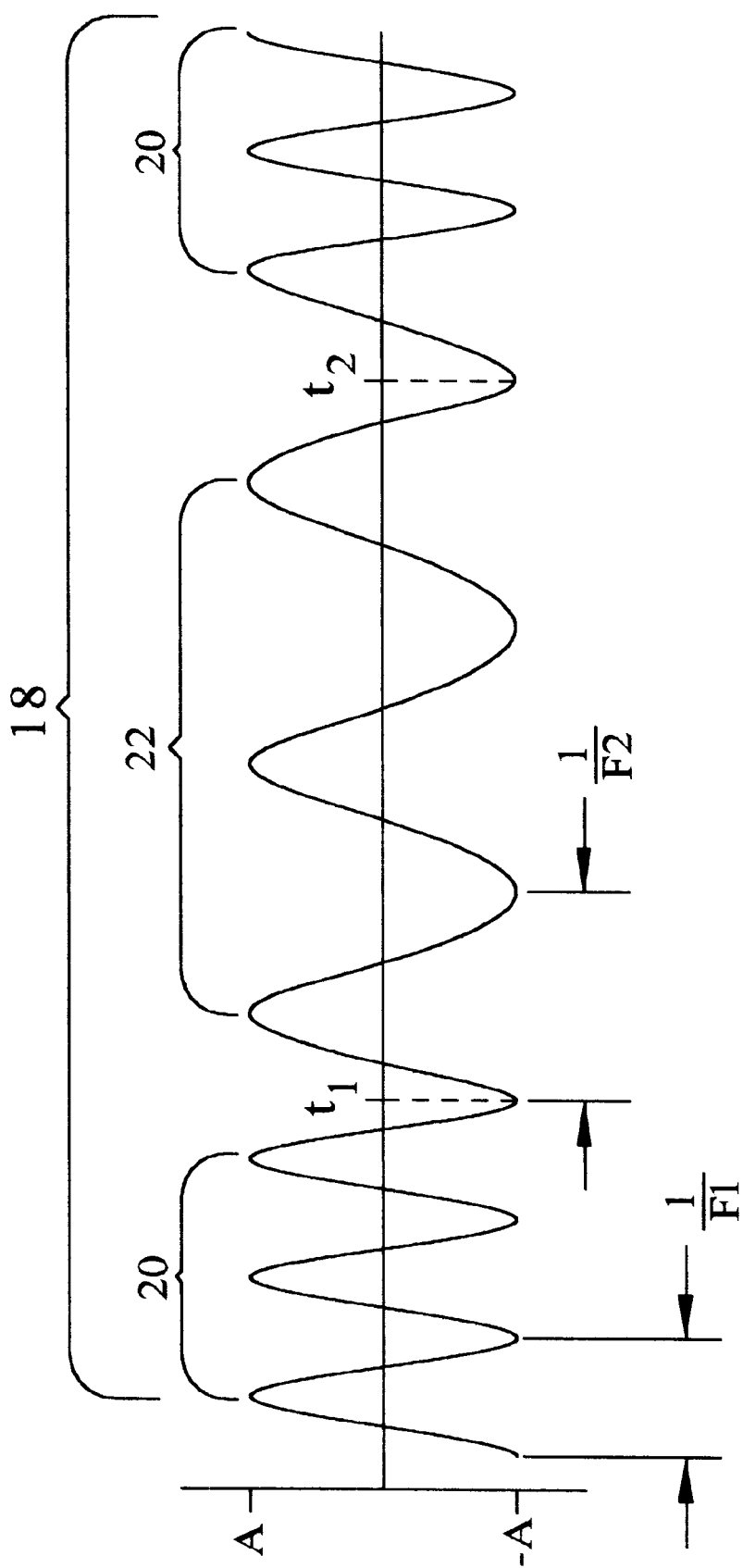
FIG. 2 shows an example of a frequency shift keyed signal.

Referring to FIG. 1, there is shown a time difference of arrival (TDOA) measurement system 10 embodying various features of the present invention for determining the TDOA of a frequency shift keyed (FSK) signal at two remote (separate) receiving stations, or sites 14 and 16. An FSK signal is a frequency modulated signal in which portions of the signal are transmitted at one of two predetermined frequencies. For example, in FIG. 2, there is shown an example of a frequency shift keyed signal 18 having an amplitude A which is comprised of signal sections 20 at frequency $F_1$ and signal sections 22 at frequency $F_2$. FSK signal 18 transitions between frequencies $F_1$ and $F_2$ at times $t_1$ and $t_2$, respectively.

Data from FSK signal 18 is sampled and processed at remote sites 14 and 16. Estimated values for the arrival time of FSK signal 18 detected at remote site 14 are encoded in signal 19 which is provided to remote site 16. FSK signal 18 as detected locally at site 16 is sampled and processed, whereupon site 16 then determines an estimate of the average time-difference-of-arrival (TDOA) of FSK signal 18 between remote sites 14 and 16. FSK signal 18 is generated by FSK signal source 12. Site 16 generates an output signal 17 representing the value of the TDOA.

Figure 3:
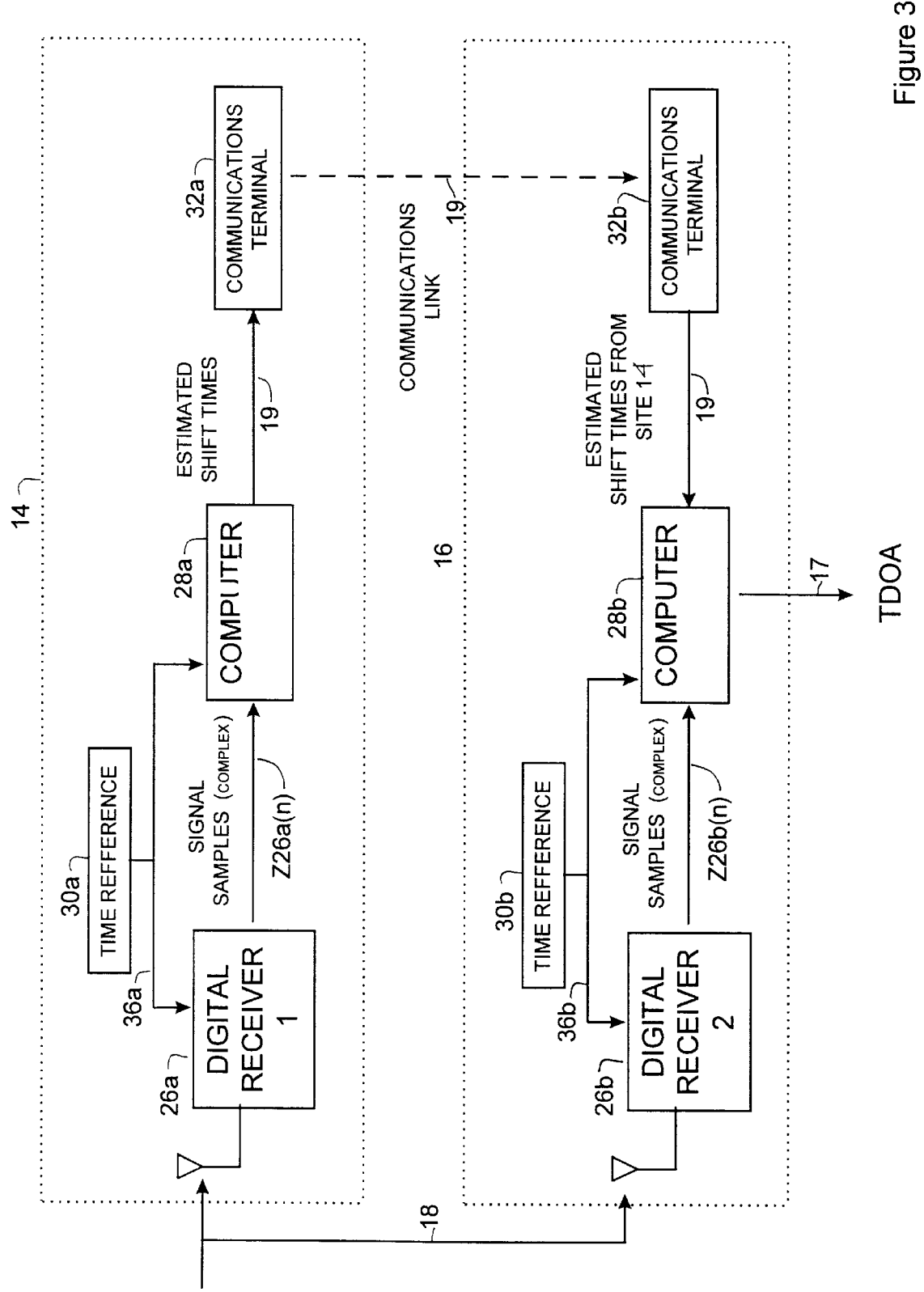
FIG. 3 shows the major components of the remote sites of FIG. 1.

Referring to FIG. 3, remote site 14 includes a digital receiver 26a, computer 28a, time reference source 30a, and communications terminal 32a. Time reference source 30a generates time reference clock signals 36a to synchronize the operation of digital receiver 26a and computer 28a and provides computer 28a with a precision time reference. Receiver 26a detects and transforms FSK signal 18 to an intermediate frequency (IF) signal. Next, receiver 26a frequency translates the IF signal to in phase ($I_{26a}$) and quadrature signals ($Q_{26a}$), both centered at 0 Hz (baseband) but offset from each other by 90 degrees in phase. Signals $I_{26a}$ and $Q_{26a}$ are sampled at a known rate for a predetermined period by an A/D converter (not shown) in receiver 26a which is synchronized by time reference signal 36a. In response to sampling the signals $I_{26a}$ and $Q_{26a}$, receiver 26a generates a sequence of N signal samples $I_{26a}(n)$ and $Q_{26a}(n)$, where n is an index represented by a positive integer value, and N is a positive integer. Receiver 26a adds signal samples $I_{26a}(n)$ and $Q_{26a}(n)$ to form complex numbers $Z_{26a}(n)$, where $Z_{26a}(n)=I_{26a}(n)+j \cdot Q_{26a}(n)$. Signal samples $I_{26a}(n)$ and $Q_{26a}(n)$ together represent samples of FSK signal 18. Receiver 26a provides output signal $Z_{26a}(n)$ which represents complex numbers whose real parts are the sampled $I_{26a}(n)$ signals and whose imaginary parts are the correspondingly sampled $Q_{26b}(n)$ signals.

As shown in FIG. 3, remote site 16 is similar to remote site 14 and includes a digital receiver 26b, computer 28b, time reference source 30b, and communications terminal 32b. Receiver 26b detects FSK signal 18, and then transforms the detected FSK signal 18 in to an intermediate frequency (IF) signal. Next, receiver 26b frequency translates the IF signal to in-phase ($I_{26b}$) and quadrature signals ($Q_{26b}$), both centered at 0 Hz (baseband) but offset from each other by 90 degrees in phase. Signal $I_{26b}$ and $Q_{26b}$ are sampled at a known rate for a predetermined period by receiver 26b by an A/D converter (not shown) which is synchronized by precision time reference clock signals 36b provided by time reference source 30b. In response to sampling the signals $I_{26b}$ and $Q_{26b}$, receiver 26b generates a sequence of signal samples $I_{26b}(n)$ and $Q_{26b}(n)$. Receiver 26b adds signal samples $I_{26b}(n)$ and $Q_{26b}(n)$ to form complex numbers $Z_{26b}(n)$, where $Z_{26b}(n)=I_{26b}(n)+j \cdot Q_{26b}(n)$. Receiver 26b provides output signal $Z_{26b}(n)$ which represents complex numbers whose real parts are the sampled $I_{26b}$ signals and whose imaginary parts are the corresponding sampled $Q_{26b}$ signals. Signal samples $I_{26b}(n)$ and $Q_{26b}(n)$ together represent samples of FSK signal 18.

Computer 28a inputs and processes complex samples $Z_{26a}(n)$ received from digital receiver 26a to estimate the frequency shift times of FSK signal 18 as detected at remote site 14. Computer 28a provides signal 19 to communications terminal 32a, where signal 19 represents the estimated frequency shift times of FSK signal 18 as detected at remote site 14. Communications terminal 32a transmits signal 19 to communications terminal 32b at remote site 16. Communications terminal 32b receives signal 19 from communications terminal 32a and throughputs signal 19 to computer 28b. Computer 28b inputs and processes complex samples $Z_{26b}(n)$ received from digital receiver 26b to estimate the frequency shift times of FSK signal 18 as detected at remote site 16. The estimated frequency shift times at remote sites 14 and 16 are processed by computer 28b to estimate the TDOA value of FSK signal 18 between remote sites 14 and 16.

Figure 4:
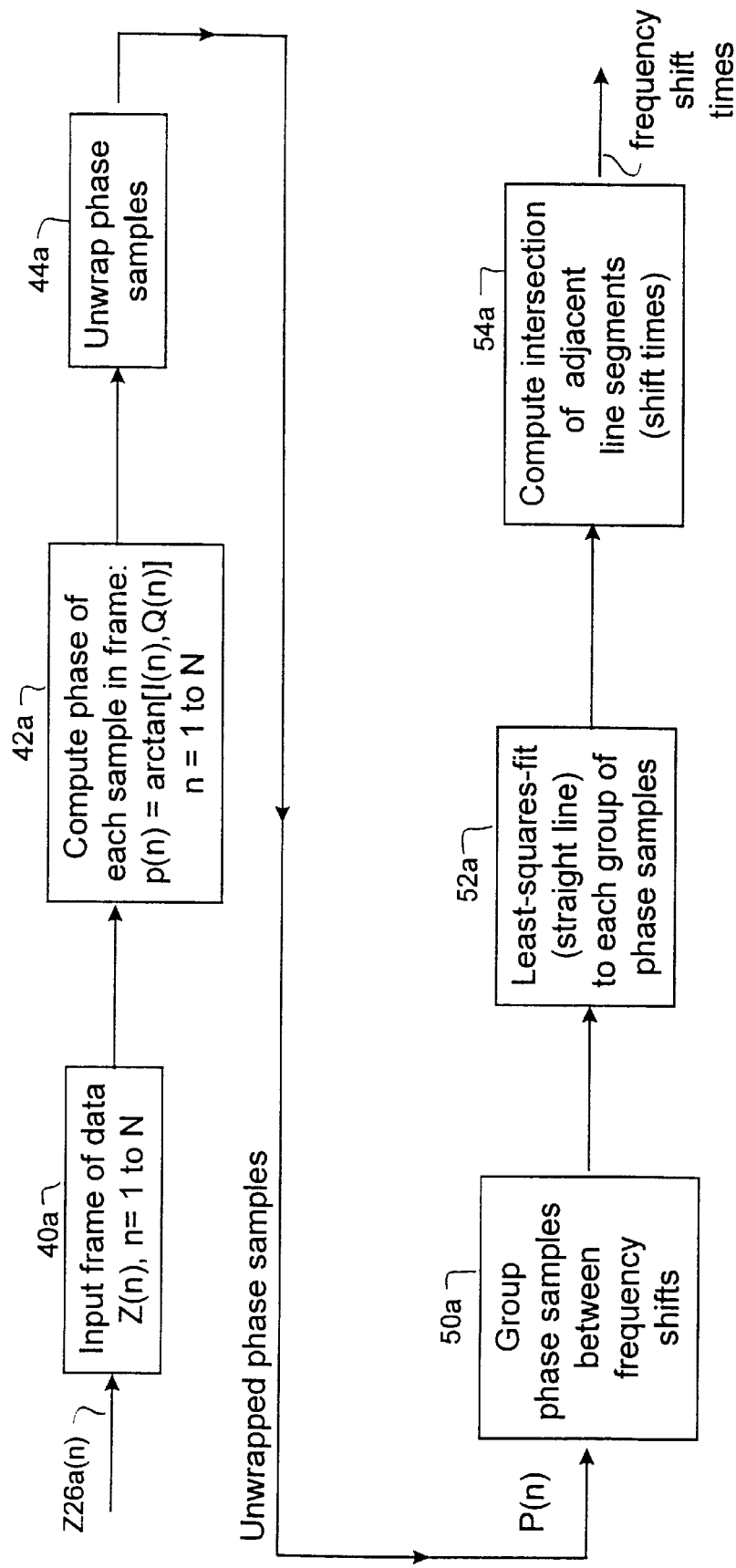
FIG. 4 is a flow chart of the operation of the computer at the first remote site.
Figure 5:
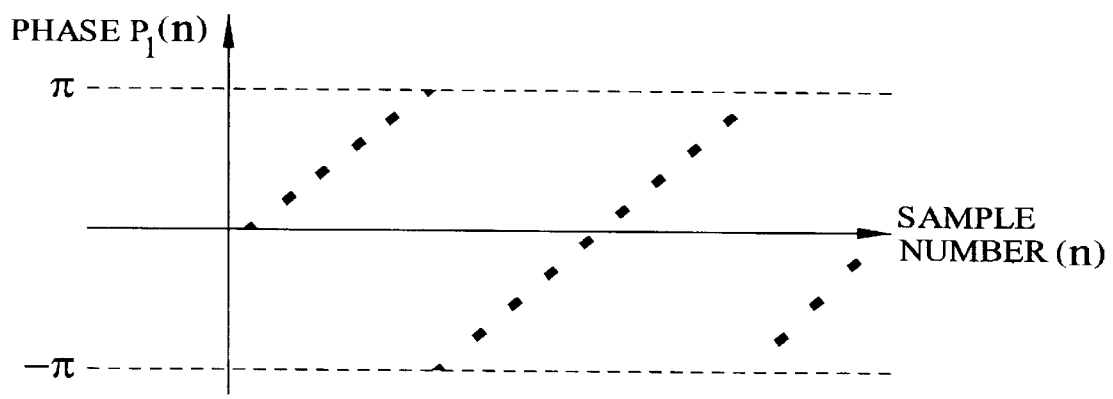
FIG. 5 is a graph exemplifying the relation between the phase and sample number.
Figure 6:
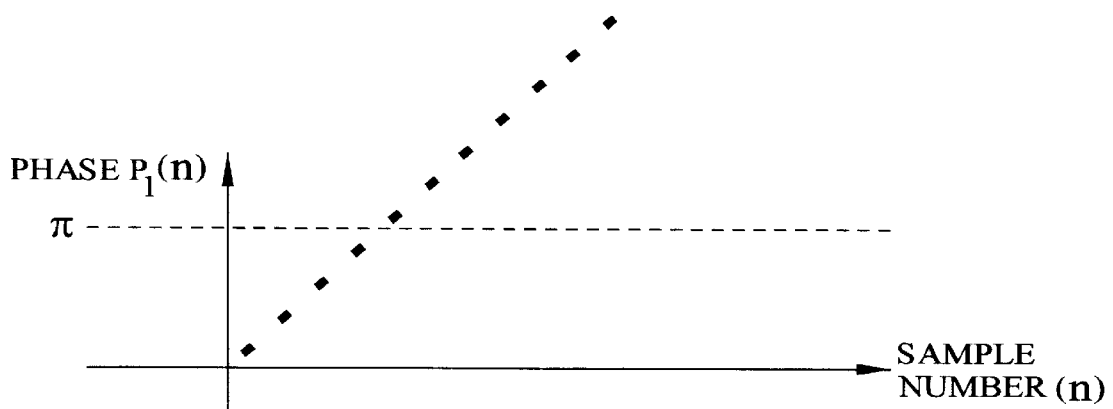
FIG. 6 is a graph exemplifying the relation between the unwrapped phase and sample number.

The operation of computer 28a is described with reference to the flow chart of FIG. 4. At step 40a, computer 28a inputs an N number of consecutive complex samples $Z_{26a}$ (n), which are received from digital receiver 26a, where n=1,2, . . . N. At step 42a, computer 28a transforms consecutive complex samples $Z_{26a}(n)$ into a sequence of phase samples, $p_1(n)=1,2,\ldots N$, where $p_1(n)$=arc_tangent $(I_{26a}(n), Q_{26a}(n))$, shown in FIG. 5. The phase samples $p_1(n)$ are "unwrapped," or transformed into unwrapped phase samples $P_1(n)$ at step 44a as shown in FIG. 6. Unwrapping phase samples $p_1(n)$ removes the phase discontinuities of $p_1(n)$ at $+/-\pi$. Thus for a FSK signal, unwrapped phase increases or decreases linearly between frequency shifts. Proceeding to step 50a, computer 28a groups consecutive unwrapped phase samples $P_1(n)$ between frequency shifts.

Figure 7:
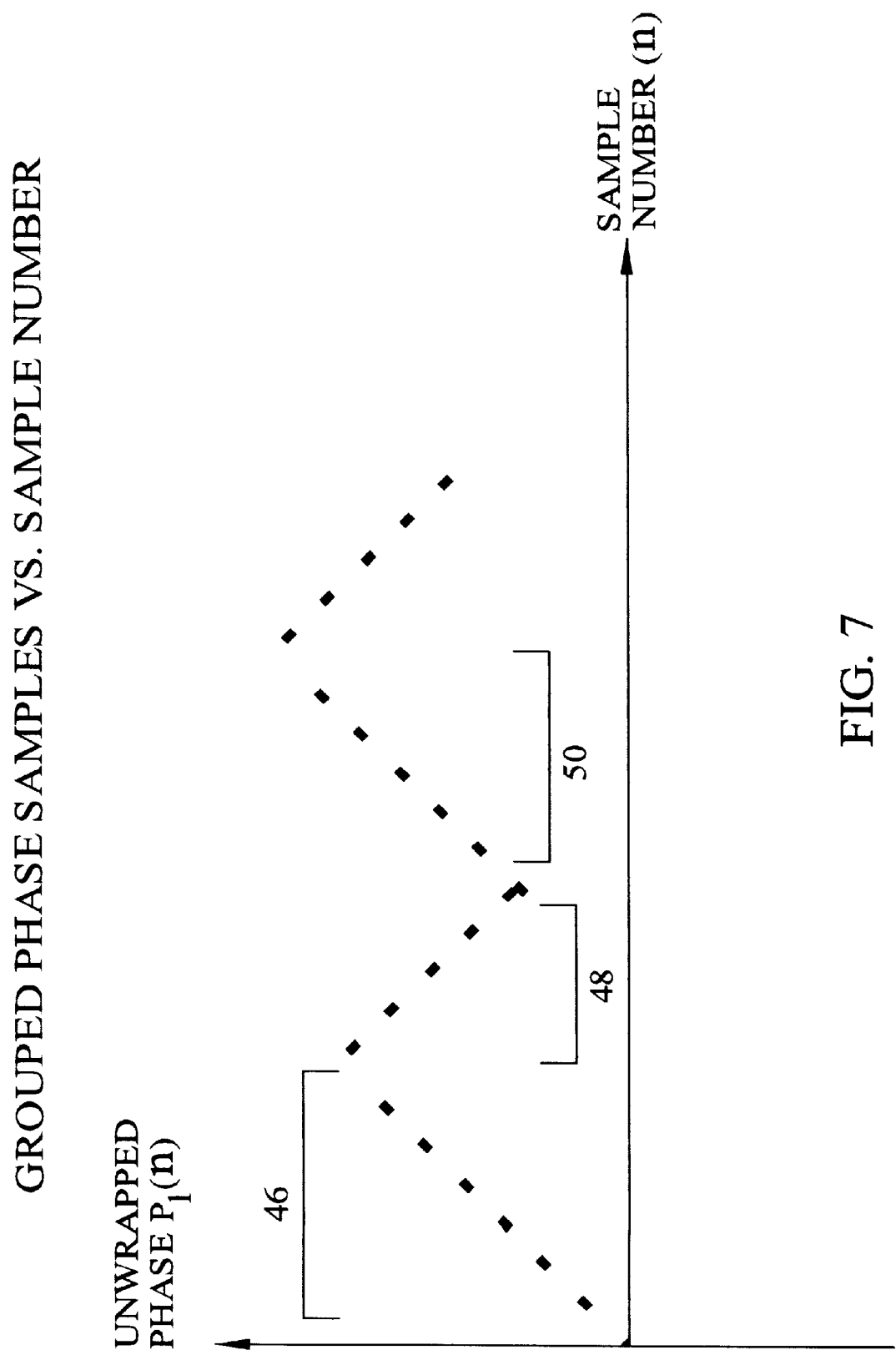
FIG. 7 is a graph exemplifying groups of phase samples between frequency shifts.
Figure 8:
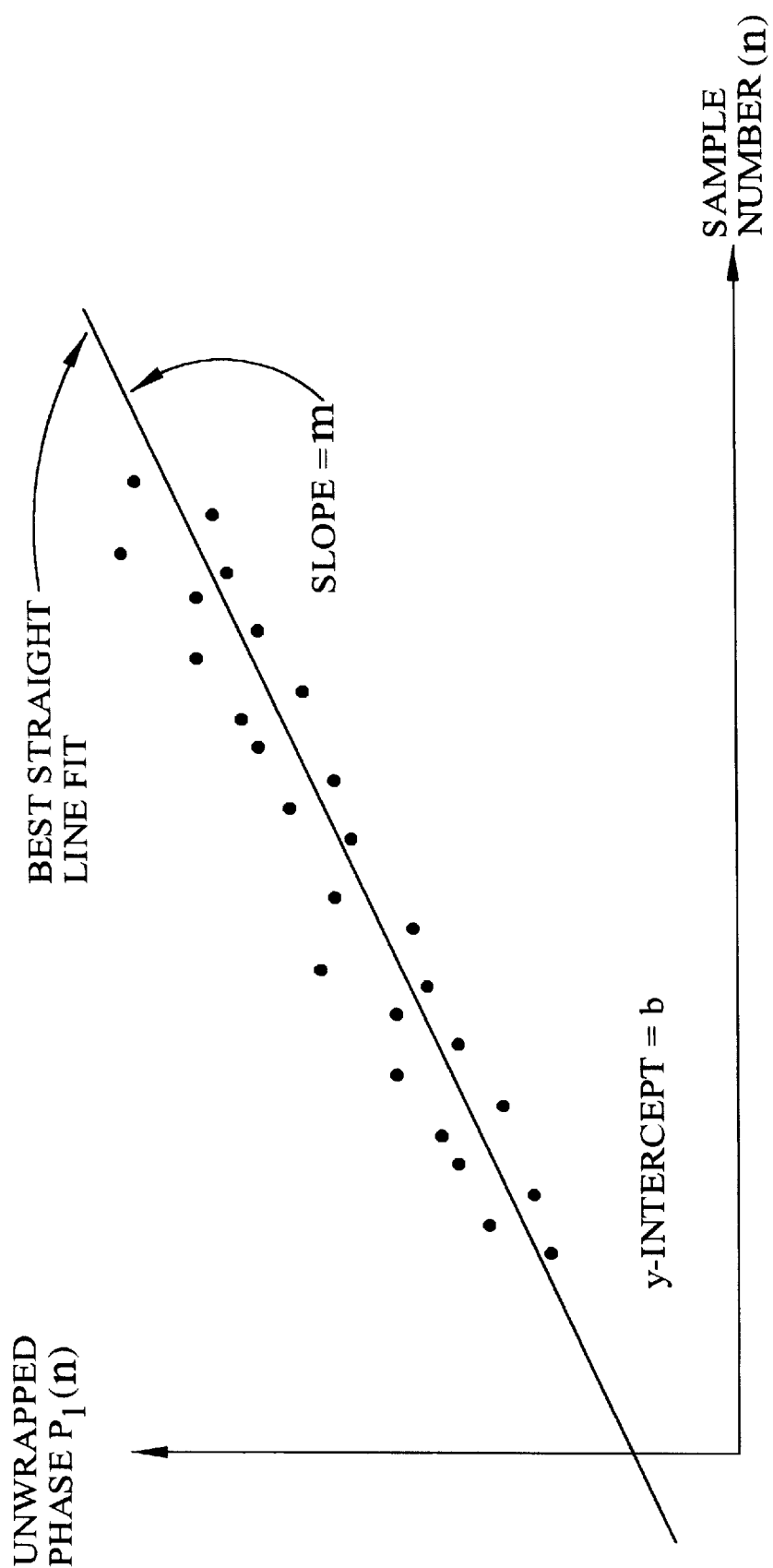
FIG. 8 is a graph showing at least-squares fit applied to a group of phase samples.
Figure 9:
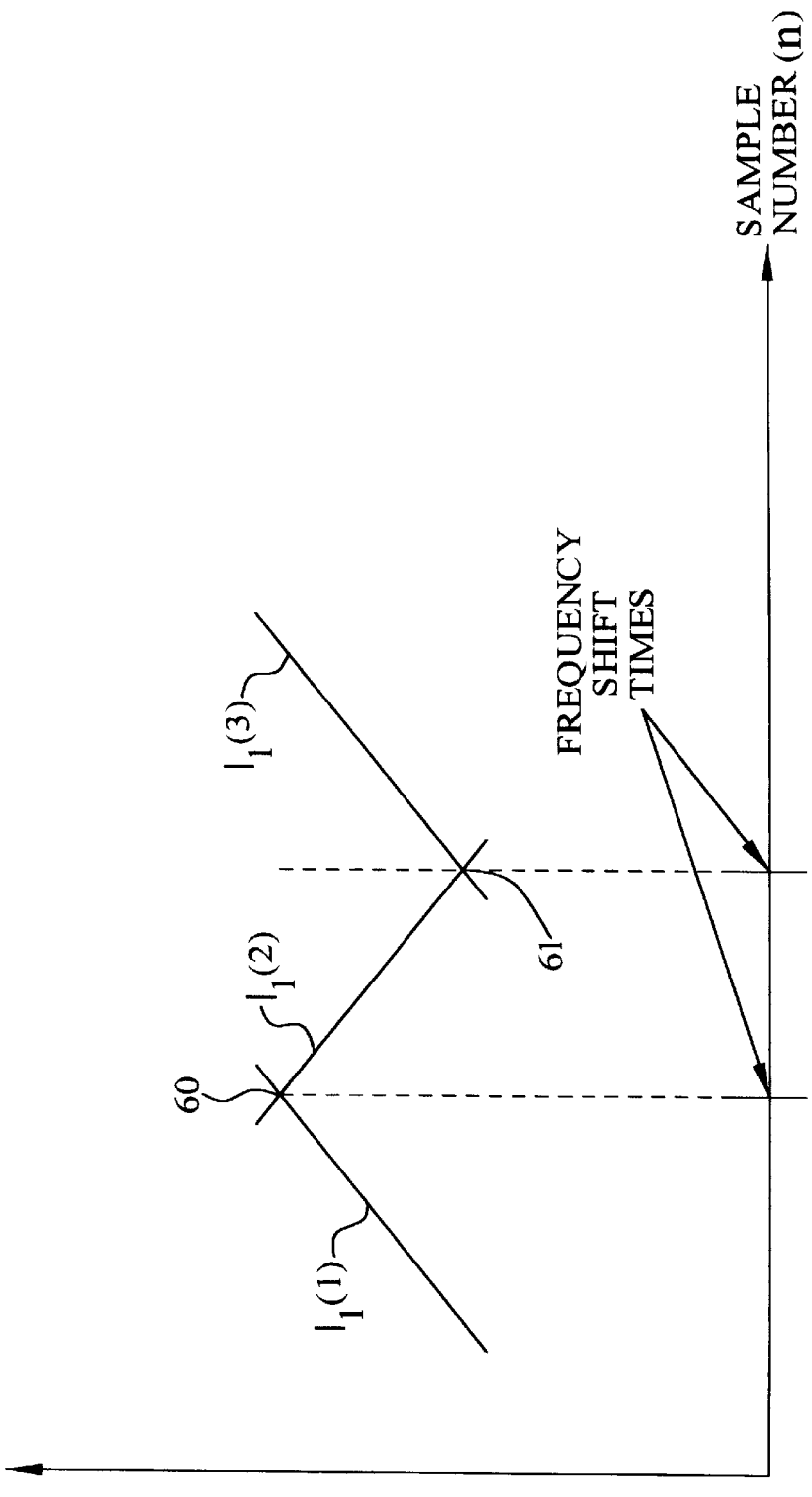
FIG. 9 shows the intersections of adjacent line segments.

FIG. 7 illustrates exemplar groups 46, 48, and 50 of unwrapped phase samples, where group 48 may consist of $[P_1(35), P_1(36), P_1(37),$ and $P_1(38)]$. At step 52a, computer 28a performs a first order (straight line) least-squares-shift for each group of unwrapped phase samples $P_1(n)$, as shown in FIG. 8. The least squares-fit produces coefficients, $a_{1i}$ and $b_{1i}$, of a linear equation, or function $F_{1i}(n)$, where $F_{1i}(n)=a_{1i}n+b_{1i}$, $a_{1i}$ represents the slope of $F_{1i}(n)$, $b_{1i}$ represents the y-intercept of $F_{1i}(n)$, n represents the sample number, and i is an index corresponding to a particular group of unwrapped phase samples. $F_{1i}(n)$ is used to define a line segment which best fits a particular group of unwrapped phase samples. At step 54a, computer 28a computes the intersections of adjacent line segments, $1_1(1), 1_1(2), \ldots 1_1(M)$, shown in FIG. 9, where M is a positive integer. These intersections are estimates of frequency shift times in non-integer (interpolated) sample units, which are stored as $t_1(k)$, where $t_1(k)=\{t_1(1), t_1(2), t_1(3), \ldots t_1(K)\}$, k is a positive integer index, K is positive integer, and K=(M−1). In FIG. 9, intersections 60 and 61 are shown by way of example. However, it is to be understood that there may any suitable number of intersections having values stored as $t_1(k)$. The values for $t_1(k)$ then are encoded in signal 19. Since the data samples $Z_{26a}(n)$ are sampled at a known rate, the frequency shift times (intersections) in sample units are linearly related to frequency shift times (intersections) in time.

Figure 10:
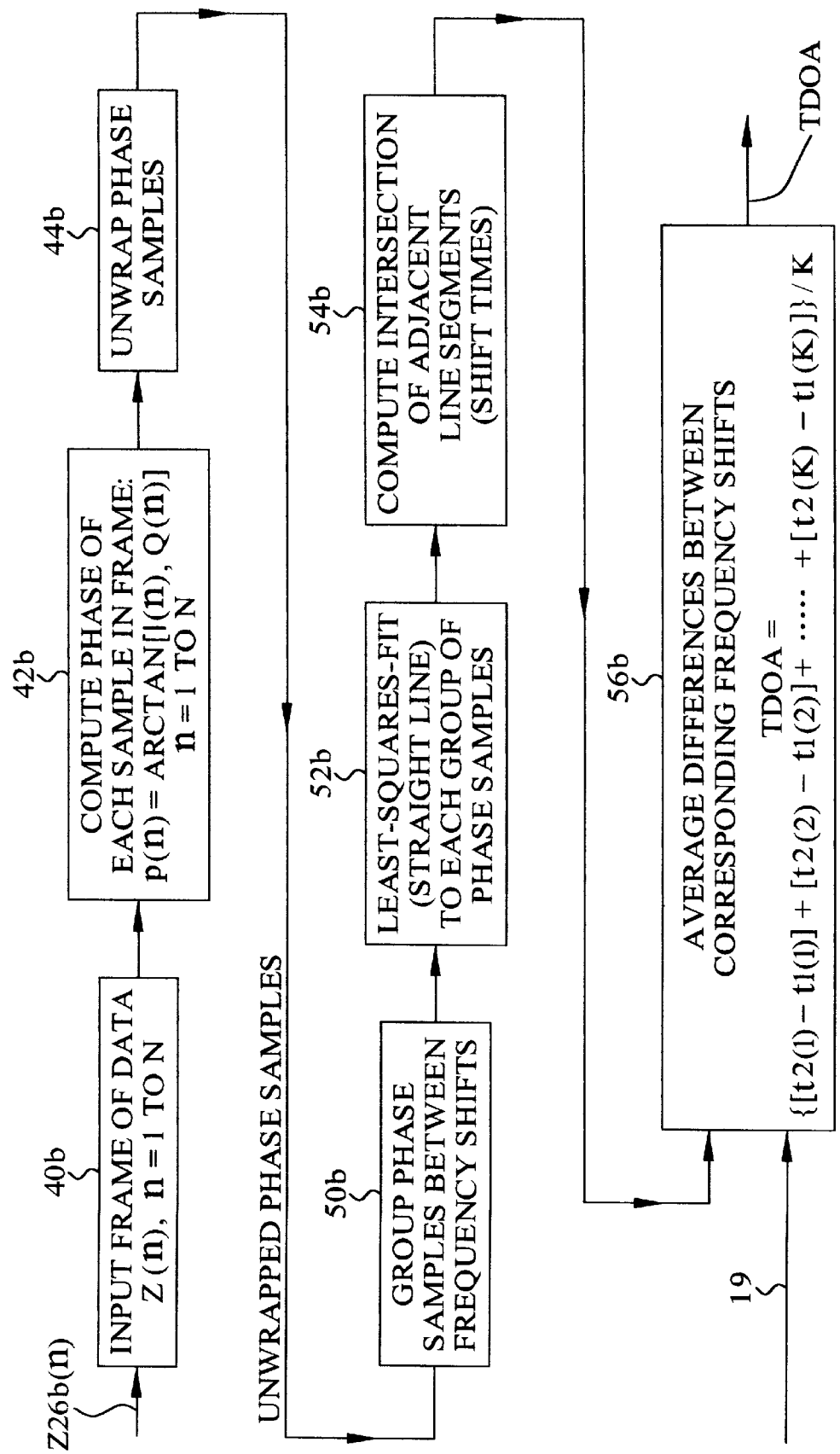
FIG. 10 is a flow chart of the operation of the computer at the second remote site.

The operation of computer 32b is described with reference to the flow chart of FIG. 10. At step 40b, computer 28b inputs an N number of consecutive complex samples $Z_{26b}(n)$ which comprise a frame of data and which are received from digital receiver 26b, where n=1,2, . . . N. At step 42b, computer 28b transforms consecutive complex samples $Z_{26b}(n)$ into a sequence of phase samples, $p_2(n)$, where: $p_2(n)$= arc_tangent $(I_{26b}(n), Q_{26b}(n))$. The phase samples $p_2(n)$ are "unwrapped" to transform phase samples, $p_2(n)$ into unwrapped phase samples $P_2(n)$ at step 44b to remove the phase discontinuities in $p_2(n)$ at $+/-\pi$. Proceeding to step 50b, computer 28b groups consecutive unwrapped phase samples $P_2(n)$ between frequency shifts. At step 52b, computer 28b performs a first order, least-squares-shift for each group of unwrapped phase samples $P_2(n)$. The least squares-fit produces coefficients, $a_{2i}$ and $b_{2i}$, which define a linear equation, or function $F_{2i}(n)$, where $F_{2i}(n)=a_{2i}n+b_{2i}$, $a_{2i}$ represents the slope of $F_{2i}(n)$, $b_{2i}$ represents the y-intercept of $F_{2i}(n)$, n is the sample number, and i is a positive integer index corresponding to a particular group of unwrapped phase samples. $F_{2i}(n)$ is used to define the line segment which best fits a particular group of unwrapped phase samples. At step 54b, computer 28b computes the intersection of an M number of adjacent line segments, where M has been defined above. The points at these intersections are estimates of a K number of frequency shift times of FSK signal 18 as detected at remote site 16, which are stored as $t_2(k)$, where $t_2(k)=\{t_2(1), t_2(2), t_2(2), \ldots t_2(K)\}$, and k and K have been defined above. The intersections of $F_{2i}(n)$ for all i may be readily transformed into time because the rate at which data $Z_{26b}$ is sampled is known. At step 56b, computer 28b inputs the frequency shift time data (signal 19), $t_1(k)$, from communications terminal 32a, and uses the frequency shift time data $t_1(k)$ from computer 28a and frequency shift time data $t_2(k)$ determined at step 54b to estimate the time difference of arrival, TDOA, between corresponding frequency shifts of $t_1(k)$ and $t_2(k)$, where:

$$TDOA=\{[t_2(1)-t_1(1)]+[t_2(2)-t_1(2)]+[t_2(3)-t_1(3)]+ \ldots + [t_2(K)-t_1(K)]\}/(K).$$

Software routines used to direct the operations of computers 28a and 28b were implemented, by way of example, in MATLAB® and are provided by way of example in APPENDIX 1 below. However, it is to be understood that other suitable software programs may also be used Obviously, many modifications and variations of the present invention are possible in light of the above teachings. For example, the invention has been described with regard to determining the TDOA for an FSK signal at two locations. However the techniques of the invention may be extended to determining time differences of arrival for other types of communications signals that contain discrete measurable events such as amplitude shift keyed (ASK) signals, phase shift keyed (PSK) signals, and other well known types of digital communications signals. All of these types of signals transition between at least two different measurable states. The invention uses the transition times between the measurable states of the signals that are received at the remote locations to determine the TDOA of the communications signal at the two locations. It is therefore to be understood that within the scope of the appended claims, the invention may be practiced otherwise than as specifically described.

APPENDIX 1

MATLAB® Code for Computing Frequency Shift Times

The following is MATLAB source code. There are 3 routines:

| | |
|---|---|
| freq_shift_time | Returns vector of frequency shift times given a frame of complex FSK signal samples. freq_shift_time calls the next 2 routines. |
| peak | Returns vector of indices of peaks in the input vector. |
| lms_fit | Returns two element vector of slope and y-intercept of the best least-mean-square fit to the input vector. |

All other function calls are standard MATLAB functions.

```
function shift_time_vec = freq_shift_time(z, sample_rate)
% Returns vector of frequency shift times.
% Input vector, z, is a frame of complex samples of FSK signal.
N = length(z);              % Number of elements in z.
p = angle(z);               % Get phase vector.
p = unwrap(p);              % Unwrap phase.
p = p ./ (2*pi);            % Convert from rads to cycles.
slope = ( p(N) - p(1))/(N-1);  % Remove gross slope.
T = 1:N;
p = p - slope .* T;
first_diff_vec = p(2:N) - p(1:N-1);    % First difference vector.
step =[ -1 -1 -1 -1 -1 -1 -1 -1 -1 -1 +1 +1 +1 +1 +1 +1 +1 +1 +1 +1 ];
c = conv( first_diff_vec, step );  % c is convolution of first_diff_vec with step.
threshold = .5 * max(abs(c));   % P is vector of indices of peaks in
P = peak(c, threshold, 10, 1000);    % convulation vector c. (See listing of peak)
           % FIT LEAST-MEAN SQUARE FIT TO EACH SEGMENT
n_peak = length(P)          % Number of peaks in peak vector
Avec = ones(n_peak-1, 2);   % Allocate coefficient vector, Avec.
for it = 1:n_peak - 1       % Loop over peaks
    i1 = P(it)     +3;      % Delete first 3 samples in segment.
    i2 = P(it+1) -3;        % Delete last 3 samples in segment
    tx = i1:i2;             % Vector of sample numbers in segment.
    ty = p(i1:i2);          % Vector of phase values in segment.
    A = lms_fit(tx, ty );   % lms_fit returns vector A =
                            % [slope, y-intercept]. (See listing of lms_fit)
    Avec(it,:) = A;         % Store LMS coefficients in Avec.
end
           %FIND INTERSECTIONS OF ADJACENT LINE SEGMENTS
Ivec = length(Avec) -1;     % Allocate vector of intersection times.
for it = 1:length(Avec) -1  % Loop over intersections
    b1 = Avec(it,2);    b2 = Avec(it+1,2);
    a1 = Avec(it,1);    a2 = Avec(it+1,1);
    Ivec(it) = ( a2-a1 )/( b1 - b2 );   % Ivec is vector of intersection times.
end
shift_time_vec = Ivec ./ sample_rate   % Convert shift times in samples to
                                       % shift times in absolute time.
return
function Index_vec = peak(X, threshold, n_squash, n_max)
% X IS INPUT VECTOR.
% FINDS A MAXIMUM of n_max peaks
% ABOVE +threshold OR BELOW -threshold in X.
% STARTS WITH LARGEST PEAK AND PROCESSES n_max PEAKS.
% n_squash POINTS BEFORE & AFTER LAST PEAK ARE ZEROED.
% Index_vec IS VECTOR OF INDICES OF PEAKS IN X.
Index_vec = zeros(1,n_max);
```

-continued

```
N = length(X);
X = abs(X);
n_peaks = 0;
for it=1:n_max
    [peak,index] = max(X);
    if peak > threshold
        Index_vec(it) = index;
        im = index - n_squash; if im < 1, im = 1; end
        ip = index + n_squash; if ip > N, ip = N; end
        X(im:ip) = zeros(1, ip-im+1 );
    else
        break
        end
    n_peaks = n_peaks + 1;
    end
Index_vec = soft(Index_vec(1:n_peaks));
return
function A = lms_fit( X,Y )
% LMS FIT. RETURNS COEFFICIENTS OF LINEAR LMS FIT TO X,Y.
% Reff: McCalla p244 ,
% f(X) = A(1) + A(2)*x
N = length (Y);
C = ones(2,2);
C(1,1) = N;
C(1,2) = sum( X );
C(2,1) = C(1,2);
C(2,2) = sum( X * X );
B    = ones(2,1);
B(1) = sum( Y );
B(2) = sum (X.* Y );
A = ( inv(C)) * B;      % since CA = B
A = A';
return
```

I claim:

1. A system for determining the time difference of arrival of a signal between two separate locations, comprising:

a first receiver located at a first site for generating first signal samples representing an FSK signal in response to receiving the FSK signal at time $T_A$;

a second receiver located at a second site for generating second signal samples representing the FSK signal in response to receiving the FSK signal at time $T_B$, where $T_A \neq T_B$;

a first computer for estimating a first set of frequency shift times of the FSK signal in response to receiving the first signal samples and a time reference signal, and for generating a first output signal representing the first set of frequency shift times; and a second computer for estimating a second set of frequency shift times of the FSK signal using the second signal samples and time reference signal, and for determining the time difference of arrival of the FSK signal between the first and second receivers using the first output signal, and the second set of frequency shift times in accordance with the relation:

$$TDOA=\{[t_2(1)-t_1(1)]+[t_2(2)-t_1(2)]+[t_2(3)-t_1(3)] \ldots + [t_2(K)-t_1(K)]\}/(K),$$

where $\{t_1(1), t_1(2), t_1(3), \ldots t_1(K)\}$ represent a K number of first frequency shift times within an N number of the first signal samples, $\{t_2(1), t_2(2), t_2(3), \ldots t_2(K)\}$ represent a K number of second frequency shifts times within an N number of the second signal samples, and where K and N are positive integers.

2. The system of claim 1 wherein said first and second receivers each are digital receivers.

3. A method for determining the time difference of arrival of a signal between two separate locations, comprising the steps of:

detecting an FSK signal with a first receiver at a first location;

generating first signal samples representing the FSK signal;

detecting the FSK signal with a second receiver at a second location;

generating second signal samples representing the FSK signal;

estimating a first set of frequency shift times of the FSK signal from the first signal samples and a time reference signal;

generating a first output signal representing the first set of frequency shift times;

estimating a second set of frequency shift times of the FSK signal from the second series of signal samples and time reference signal; and determining the time difference of arrival of the FSK signal at the first and second receivers using the first output signal, and the second set of frequency shift times, wherein the time difference of arrival is determined in accordance with the relation:

$$TDOA=\{[t_2(1)-t_1(1)]+[t_2(2)-t_1(2)]+[t_2(3)-t_1(3)] \ldots + [t_2(K)-t_1(K)]\}/K,$$

where $\{t_1(1), t_1(2), t_1(3), \ldots t_1(K)\}$ represent a K number of the first frequency shift times within an N number of the first signal samples, $\{t_2(1), t_2(2), t_2(3), \ldots t_2(K)\}$ represent a K number of the second frequency shifts times within an N number of the second signal samples, and K and N are positive integers.

4. A system for determining the time difference of arrival of a signal at two separate locations, comprising:

a first receiver located at a first site for generating first signal samples representing a signal that transitions between first and second states;

a second receiver located at a second site for generating second signal samples representing the signal;

a first computer for estimating a first set of transition times within the signal in response to receiving the first signal samples and a time reference signal, and for generating a first output signal representing the first set of transition times, where the first transition times occur when the signal transitions between the first and second states; and a second computer for estimating a second set of transition times within the signal using the second series of signal samples and time reference signal, and for determining the time difference of arrival of the signal at the first and second receivers using the first output signal, and the second set of transition times, wherein the time difference of arrival is determined in accordance with the relation;

$$TDOA=\{[t_2(1)-t_1(1)]+[t_2(2)-t_1(2)]+[t_2(3)-t_1(3)]\ldots+[t_2(K)-t_1(K)]\}/K,$$

where $\{t_1(1), t_1(2), t_1(3), \ldots t_1(K)\}$ represent a K number of first frequency shift times within an N number of the first signal samples, $\{t_2(1), t_2(2), t_2(3), \ldots t_2(K)\}$ represent a K number of second frequency shifts times within an N number of the second signal samples, and K and N are positive integers.

5. The system of claim 4 wherein the communications signal is a phase shift keyed signal.

6. The system of claim 5 wherein the communications signal is an amplitude shift keyed signal.

7. A method for determining the time difference of arrival of a signal at two separate locations, comprising the steps of:

detecting a signal that transitions between first and second states with a first receiver at a first location;

generating first signal samples representing the signal;

detecting the signal with a second receiver at a second location;

generating second signal samples representing the signal;

estimating a first set of transition times of the signal from the first signal samples and a time reference signal, where the first transition times occur when said signal transitions between the first and second states;

generating a first output signal representing the first transition times;

estimating a second set of transition times of the signal from the second signal samples and time reference signal, where the second transition times occur when said signal transitions between the first and second states; and determining the time difference of arrival of the signal at the first and second receivers using the first output signal and the second transition times, wherein said time difference of arrival is determined in accordance with the relation:

$$TDOA=\{[t_2(1)-t_1(1)]+[t_2(2)-t_1(2)]+[t_2(3)-t_1(3)]\ldots+[t_2(K)-t_1(K)]\}/K,$$

where $\{t_1(1), t_1(2), t_1(3), \ldots t_1(K)\}$ represent a K number of first frequency shift times within an N number of the first signal samples, $\{t_2(1), t_2(2), t_2(3), \ldots t_2(K)\}$ represent a K number of second frequency shifts times within an N number of the second signal samples, and K and N are positive integers.

8. A system for determining the time difference of arrival of a signal between two separate locations, comprising:

a first receiver for receiving a signal that transitions between two different states and for transforming said signal into an n number of pairs of first in-phase and quadrature signal samples, where n is a positive integer index;

a first computer for determining:

a) phase values $P_1(n)$ for each of said first in-phase and quadrature signal samples; and b) transition times $t_1(1), t_1(2), t_1(3), \ldots t_1(k_1)$ when said signal transitions between said first and second states, where $k_1$ represents the number of transitions detected from said n number of first in-phase and quadrature signal samples, and said transition times are determined from said phase values $P_1(n)$;

a second receiver for transforming said signal into an n number of pairs of second in-phase and quadrature signal samples; and a second computer for determining:

a) phase values $P_2(n)$ for each of said second in-phase and quadrature signal samples;

b) transition times $t_2(1), t_2(2), t_2(3), \ldots t_2(k_2)$ when said signal transitions between said first and second states, where $k_2$ represents the number of transitions detected from said n number of second in-phase and quadrature signal samples, $k_2=k_1$, and said transition times are determined from said phase values $P_2(n)$; and c) a time difference of arrival TDOA of said signal between said first and second receivers, where $$TDOA=\{[t_2(1)-t_1(1)]+[t_2(2)-t_1(2)]+[t_2(3)-t_1(3)]\ldots+[t_2(k_1)-t_1(k_1)]\}/k_1.$$

9. The system of claim 8 wherein:

said first computer is programmed to:

transform said phase values $P_1(n)$ into first unwrapped phase samples;

group said first unwrapped phase samples into first group sets;

perform a least squared fit on each said first group set to define a set of first linear functions;

define a sequence of first adjacent linear functions from said first linear functions; and determine a set of first intersections of said first adjacent linear functions, where said first intersections represent said transition times $t_1(1), t_1(2), t_1(3) \ldots$ and $t_1(k_1)$; and said second computer is programmed to:

transform said phase values $P_2(n)$ of said into second unwrapped phase samples;

group said second unwrapped phase samples into second group sets;

perform a least squared fit on each said second group set to define a set of second linear functions;

define a sequence of second adjacent linear functions from said second linear functions; and determine a set of second intersections of said second adjacent linear functions, where said second intersections represent said transition times $t_2(1), t_2(2), t_2(3) \ldots$ and $t_2(k_2)$.

10. A method for determining the time difference of arrival of a signal between two separate locations, comprising the steps of:

receiving a signal at a first location where said signal transitions between two different states;

transforming said signal into an n number of pairs of first in-phase and quadrature signal samples, where n is a positive integer index;

determining phase values $P_1(n)$ for each of said first in-phase and quadrature signal samples;

determining transition times $t_1(1)$, $t_1(2)$, $t_1(3)$, ... $t_1(k_1)$ when said signal transitions between said first and second states, where $k_1$ represents the number of transitions detected from said n number of first in-phase and quadrature signal samples, and said transition times are determined from said phase values $P_1(n)$;

receiving said signal at a second location;

transforming said signal into an n number of second in-phase and quadrature signal samples;

determining phase values $P_2(n)$ for each of said second in-phase and quadrature signal samples;

determining transition times $t_2(1)$, $t_2(2)$, $t_2(3)$, ... $t_2(k_2)$ when said signal transitions between said first and second states, where $k_2$ represents the number of transitions detected from said n number of second in-phase and quadrature signal samples, $k_2=k_1$, and said transition times are determined from said phase values $P_2(n)$; and determining a time difference of arrival TDOA of said signal between said first and second receivers, where:

$$TDOA=\{[t_2(1)-t_1(1)]+[t_2(2)-t_1(2)]+[t_2(3)-t_1(3)] \ldots + [t_2(k_1)-t_1(k_1)]\}/k_1.$$

11. The method of claim 10 further including the steps of:

transforming said phase values $P_1(n)$ into first unwrapped phase samples;

grouping said first unwrapped phase samples into first group sets;

performing a least squared fit on each said first group set to define a set of first linear functions;

defining a sequence of first adjacent linear functions from said first linear functions;

determining a set of first intersections of said first adjacent linear functions, where said first intersections represent said transition times $t_1(1)$, $t_1(2)$, $t_1(3)$ ... and $t_1(k_1)$;

transforming said phase values $P_2(n)$ of said into second unwrapped phase samples;

grouping said second unwrapped phase samples into second group sets;

performing a least squared fit on each said second group set to define a set of second linear functions;

defining a sequence of second adjacent linear functions from said second linear functions; and determining a set of second intersections of said second adjacent linear functions, where said second intersections represent said transition times $t_2(1)$, $t_2(2)$, $t_2(3)$ ... and $t_2(k_2)$.

12. A method for determining the time difference of arrival of a signal between two separate locations, comprising the steps of:

receiving a signal at a first location where said signal transitions between two different states;

transforming said signal into an n number of pairs of first in-phase and quadrature signal samples, where n is a positive integer index;

determining phase values $P_1(n)$ for each of said first in-phase and quadrature signal samples;

determining first transition times $t_1(1)$, $t_1(2)$, $t_1(3)$, ... $t_1(k_1)$ when said signal transitions between said first and second states, where $k_1$ represents the number of transitions detected from said n number of first in-phase and quadrature signal samples, and said transition times are determined from said phase values $P_1(n)$;

receiving said signal at a second location;

transforming said signal into an n number of second in-phase and quadrature signal samples;

determining phase values $P_2(n)$ for each of said second in-phase and quadrature signal samples;

determining second transition times $t_2(1)$, $t_2(2)$, $t_2(3)$, ... $t_2(k_2)$ when said signal transitions between said first and second states, where $k_2$ represents the number of transitions detected from said n number of second in-phase and quadrature signal samples, $k_2=k_1$, and said transition times are determined from said phase values $P_2(n)$; and determining a time difference of arrival TDOA of said signal between said first and second receivers from said first transition times transition times $t_1(1)$, $t_1(2)$, $t_1(3)$, ... $t_1(k_1)$, and second transition times $t_2(1)$, $t_2(2)$, $t_2(3)$, ... $t_2(k_2)$.

13. The method of claim 12 wherein said time difference of arrival is determined in accordance with the following algorithm:

$$TDOA=\{[t_2(1)-t_1(1)]+[t_2(2)-t_1(2)]+[t_2(3)-t_1(3)] \ldots + [t_2(k_1)-t_1(k_1)]\}/k_1.$$

14. The method of claim 12 further including the steps of:

transforming said phase values $P_1(n)$ into first unwrapped phase samples;

grouping said first unwrapped phase samples into first group sets;

performing a least squared fit on each said first group set to define a set of first linear functions;

defining a sequence of first adjacent linear functions from said first linear functions;

determining a set of first intersections of said first adjacent linear functions, where said first intersections represent said first transition times $t_1(1)$, $t_1(2)$, $t_1(3)$ ... and $t_1(k_1)$;

transforming said phase values $P_2(n)$ of said into second unwrapped phase samples;

grouping said second unwrapped phase samples into second group sets;

performing a least squared fit on each said second group set to define a set of second linear functions;

defining a sequence of second adjacent linear functions from said second linear functions; and determining a set of second intersections of said second adjacent linear functions, wherein said second intersections represent said second transition times $t_2(1)$, $t_2(2)$, $t_2(3)$ ... and $t_2(k_2)$.

* * * * *